April 12, 1960 M. C. HEMSWORTH 2,932,440
COMPRESSOR BLADE ADJUSTMENT MEANS
Filed May 20, 1955
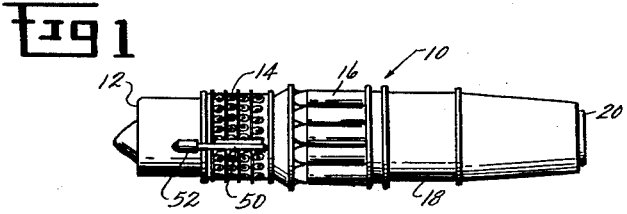
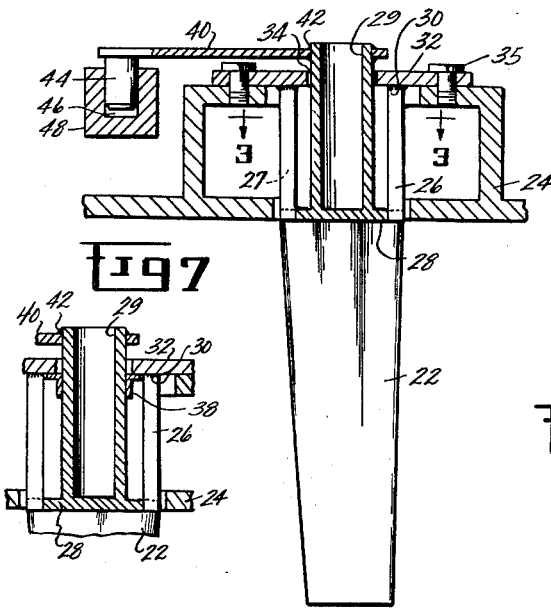
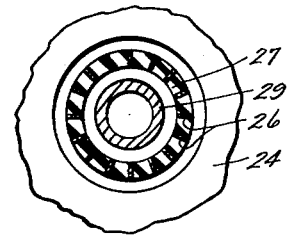
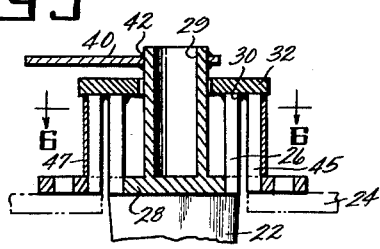
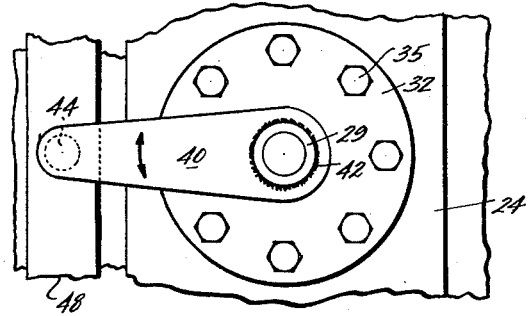
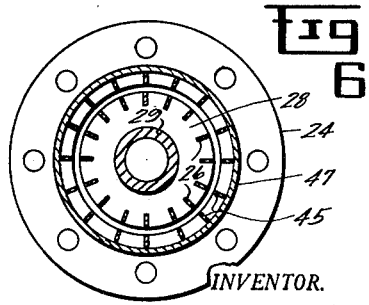
INVENTOR.
MARTIN C. HEMSWORTH
BY
Edward M. Little
HIS ATTORNEY—

United States Patent Office 2,932,440
Patented Apr. 12, 1960

2,932,440

COMPRESSOR BLADE ADJUSTMENT MEANS

Martin Carl Hemsworth, Cincinnati, Ohio, assignor to General Electric Company, a corporation of New York Application May 20, 1955, Serial No. 509,886

4 Claims. (Cl. 230—114)

This invention relates to a gas turbine type engine and in particular to an axial flow compressor for a turbomachine.

In the normal type turbojet engine, motive fluid is compressed in the compressor and passes downstream into the combustion chamber for the combustion process after which it then enters into the turbine section and passes downstream through the exhaust nozzle to the atmosphere. The velocity of the issuing jet gives the thrust to the jet engine. The higher the air is compressed initially the greater the velocity of the issuing gases to provide greater thrust. Therefore, in order to obtain more thrust from a turbojet engine, it is very desirable to have a high pressure ratio compressor for the engine. However, when a high pressure ratio compressor is used, stall characteristics occur during various stages of increasing speed and various types of operating conditions. In order to prevent these stall characteristics from occurring, it is desirable to incorporate stator vanes which are adapted to be varied so as to provide the correct airfoil position for the particular velocity of flowing air. The operating characteristics of the compressor are thereby improved by this method under certain running conditions by changing the direction or quantity of airflow. It is therefore an object of this invention to provide a multiple positioning scheduling device for actuating the angles of attack of one or more stages, or rows, of stationary vanes in an axial flow compressor simultaneously according to a predetermined relationship.

In order to eliminate the stall characteristics in high pressure ratio compressors, the stages of stator vanes of a compressor must be rotated a different amount. However, in rotating these stator vanes, bearings of various types having various drawbacks have been used. These bearings fail as a result of a certain amount of stickiness or seizing due to dirt and foreign matter of different types finding their way into the bearing. Also, the water in the bearings can freeze thereby making them inoperative or at least difficult to operate. Further, some of the bearings are located in the aft portion of the compressor where the temperatures may reach as high as 1000° F. In addition, it becomes exceedingly difficult in those areas to maintain adequate lubrication. It is therefore, another object of this invention to obviate the above difficulties by providing a means for rotating the stator vanes without the use of conventional bearings.

It is still another object of this invention to provide a compressor for a turbojet engine having stages of stator blades therein which are mounted in such a manner so as to be capable of being rotated, the base of the blades having flexible members and a rigid member so that when the rigid member is turned the flexible members are twisted so as to rotate the blade.

These and other objects will become more apparent when read in the light of the accompanying drawing wherein like parts have like numbers and wherein the parts are referred to by specific name but are intended to be as generic in their application as the prior art will permit and wherein;

Figure 1 is a side elevational view of a turbojet engine showing the actuating means for varying the stator blades of a compressor for a turbojet engine, Figure 2 is a cross-sectional view of one of the stator blades in the compressor casing, Figure 3 is a cross-sectional view taken on lines 3—3 of Figure 2, Figure 4 is a top elevational view showing the actuator band and lever arm connected to the stator blade, Figure 5 is a cross-sectional view of another embodiment of a variable stator blade, Figure 6 is a cross-sectional view of the base of the stator blade as taken on lines 6—6 of Figure 5, Figure 7 is a cross-sectional view showing another modification.

Briefly stated and in accordance with one aspect of my invention, the stator blade of a compressor for a turbojet engine is mounted for partial rotation in the casing of the compressor by providing flexible members on the base of the stator blade, which flexible members are fixed to the stator casing and base of the stator vane, and by providing a rigid tubular portion fixed to the base of the stator vane for connection to the lever arm and actuation band so that when the rigid tubular portion is partially rotated by the lever arm, the flexible members attaching the base of the stator vane to the compressor casing twist to enable the stator vane to turn the desired amount. In this manner the correct angle of attack for the flight condition can be provided.

Referring to the drawing, and in particular to Figure 1, the numeral 10 generally designates a turbojet engine having an inlet 12 for taking on motive fluid, the fluid then passes through a compressor 14 for compressing the motive fluid for combustion purposes in the combustors 16. The hot gases leaving the combustors pass through the turbine section 18 from which a portion of the energy from the motive fluid is taken for operating the compressor with the resulting motive fluid passing through the exhaust nozzle 20 for producing the thrust.

Referring to Figures 2, 3 and 4, the stator blades of the compressor are mounted for partial rotational movement by having the stator vane 22 fixed to the casing 24 of the compressor 14 by a flexible joint. This flexible joint comprises a plurality of radially extending flexible members 26 which are axially stiff and torsionally flexible. The flexible members are arranged in a ring fixed to the blade base 28 and to the compressor casing 24 as shown at 30 by welding, brazing, or the like. In order to prevent leakage of the motive fluid through the flexible joint, rubber or similar flexible material 27 can be molded about the flexible members 26 to form a cylindrical sleeve. It is noted that the flexible members 26 can be welded to a plate 32 having a central aperture therein 34 through which the rigid tubular portion 29 extends or the plate 32 can be made integral with the compressor casing. The plate 32 is secured to the compressor casing by means of bolts 35 or the like. In order to partially rotate the tubular member 29, a lever 40 is fixed to the tubular portion by welding or the like as shown at 42. This lever can be flexible which is the subject of my co-pending application, Serial No. 509,944, filed May 20, 1955, and assigned to the present assignee. The lever arm 40 is further provided with a pin 44 which is adapted to fit into a bore or the like 46. The bore 46 is positioned in the actuator band 48 in predetermined relationship with respect to the angle of attack of the stator vane.

In order to actuate the actuator bands 48, the actuator band is connected to an actuator rod 50 and actuating mechanism 52 for rotating the rod 50 which may be of the type in patent application Serial No. 481,226, filed Jan. 11, 1955, assigned to the assignee of the present application. Also, any control mechanism for sensing various parameters such as speed, temperature, and pressure which can transmit a signal to the actuator 52 can be used.

In response to a signal from one of the parameters such as speed, temperature or pressure, the actuator 52 moves the rod 50 a predetermined amount which movement is transmitted to the actuator bands 48. The actuator bands transmit its movement to the lever arms 40 for rotation thereof. It is noted that the openings or bores 46 tend to remain in a radial direction causing the pins 44 to follow. This will create a twisting motion in the lever 40. Since the lever 40 can be flexible, it will not be subject to binding or the like by virtue of the lever 40 rotating in a different plane from the actuator band 48. Upon the lever 40 rotating, its motion is transmitted to the rigid tubular portion 29 which is connected to the base of the blade 22. Since the blades are also supported to the casing 24 by flexible supports 26 which resist both tensile and compressive loads, the motion of the lever 40 is transmitted to the blade 22 to turn it a predetermined amount.

When it is desirable to provide more angular motion to the stator vane 22, the embodiment shown in Figures 5 and 6 can be used. In this embodiment, the stator blade 22 is provided with two concentric rings of flexible members, one of the concentric rings 26 being fixed to the base 28 and the plate 32 and the other concentric ring of flexible members 45 being fixed to the plate 32 and the compressor casing 24. In order to prevent leakage of the motive fluid, a shield 47 is provided. Also, rubber can be molded between the flexible member as shown in Figure 2. The rest of the construction is the same as shown in Figures 1-4.

The operation of this embodiment is the same as described with respect to Figures 1-4 in which the actuating mechanism rotates the actuator bands in response to a signal sensing device, for example temperature, pressure or speed so as to position the stator vane in such a manner as to provide the correct angle of attack for the particular flight condition.

Referring to Figure 7, a metallic sleeve 38 can be used in place of the molded rubber or the like 27 to prevent the leakage of motive fluid. The remaining structure is the same as in Figure 2.

In summary, the above arrangement will permit the variable stator vanes to be partially rotated without the accompanying rubbing of surfaces normally found in the use of conventional bearings or the like. The inherent difficulties encountered in using conventional bearings are thereby eliminated. For example, bearing races becoming gouged due to vibratory forces is eliminated.

The above embodiments have been given by way of illustration and not by way of limitation since many modifications can be made to the above structure, which modifications are intended to be regarded as equivalents and be included within the spirit and scope of this invention. For example, the particular variable stator mechanism may be applicable to the nozzle diaphragms in the turbine area as well.

What I claim as new and desire to secure by Letters Patent of the United States is:

1. A compressor for a turbojet engine including a casing and a plurality of stator vanes mounted therein, each of said stator vanes having a radially extending rigid portion and a cylindrical radially extending torsionally flexible portion, said rigid portion protruding through the flexible portion, actuating means connected to the rigid portion for rotating the stator vanes, said flexible portion being connected to said casing to support the vanes and permit the stator vanes to be partially rotated.

2. An axial flow compressor including a casing and a plurality of stages of stator vanes mounted therein, an actuator band for each stage, means for rotating said actuator band, each actuator band being connected to the stator vanes through lever arms for partial rotation thereof, said stator vanes each having a radially extending rigid portion and a cylindrical radially extending torsionally flexible portion, said rigid portion protruding through the flexible portion and being connected to said lever arm so as to rotate therewith, said flexible portion being connected to said casing to support the vanes and permit partial rotation of the stator vanes with respect to the compressor casing, said flexible portion including a plurality of axially stiff members surrounding said rigid portion.

3. A compressor including a casing and a plurality of blades mounted therein and extending radially inwardly into the motive fluid, said blades each having a base provided with a radially outwardly extending grid portion and a cylindrical radially outwardly extending torsionally flexible portion, said rigid portion protruding through the flexible portion, actuation means connected to the rigid portion for rotating the blade, said flexible portion including a plurality of axially stiff members connected to the casing of the turbomachine to permit partial rotation of the blades.

4. In a turbomachine comprising a casing for the passage of motive fluid therethrough, blade-like members, torsionally flexible means including a plurality of axially stiff members connected to the casing and to the blade-like members for supporting said blade-like members on the casing, said axially stiff members being arranged in a ring, rigid means means connected to said blade-like members and extending through said ring of axially stiff members and said casing, actuating means operatively connected to said rigid means for imparting rotational motion thereto, and sealing means surrounding said axially stiff members to prevent loss of motive fluid.

References Cited in the file of this patent

UNITED STATES PATENTS

| | | |
|---|---|---|
| 1,973,573 | Lougheed | Sept. 11, 1934 |
| 2,065,974 | Marguerre | Dec. 29, 1936 |
| 2,728,518 | Wilde et al. | Dec. 27, 1955 |

FOREIGN PATENTS

| | | |
|---|---|---|
| 590,141 | Great Britain | July 9, 1947 |